United States Patent [19]
Katsura et al.

[11] Patent Number: 5,941,369
[45] Date of Patent: Aug. 24, 1999

[54] FOOD CONVEYING RESIN BELT

[75] Inventors: Hiroshi Katsura, Hyogo; Nobuo Miyano; Kazuhiro Mizuno, both of Tokyo; Takao Endo, Osaka, all of Japan

[73] Assignees: Mitsiboshi BeltingLtd., Hyogo; Kishimoto Sangyo Co., Ltd, Osaka, both of Japan

[21] Appl. No.: 08/889,592

[22] Filed: Jul. 8, 1997

[30] Foreign Application Priority Data

Jul. 8, 1996 [JP] Japan .................................. 8-177982

[51] Int. Cl.$^6$ ...................................................... B65G 15/34

[52] U.S. Cl. ............................................ 198/847; 198/846

[58] Field of Search ............................... 198/846, 847, 198/850, 852, 853

[56] References Cited

U.S. PATENT DOCUMENTS

| | | | |
|---|---|---|---|
| 5,586,643 | 12/1996 | Zabron et al. | 198/853 |
| 5,697,491 | 12/1997 | Alex | 198/847 X |

FOREIGN PATENT DOCUMENTS

| | | | |
|---|---|---|---|
| 4-33405 | 2/1992 | Japan | H03H 9/64 |
| 4-33406 | 2/1992 | Japan | H03H 15/00 |
| 4-55207 | 2/1992 | Japan | 198/847 |
| 4333407 | 11/1992 | Japan | 198/846 |

Primary Examiner—James R. Bidwell
Attorney, Agent, or Firm—Sughrue, Mion, Zinn, Macpeak & Seas, PLLC

[57] ABSTRACT

In a food conveying resin belt in which its conveying face is formed with a resin layer, an antibacterial and antifungal agent composition containing bis-(2-pyridylthio-1-oxido)-zinc as its active ingredient is included in the resin layer. High antibacterial and antifungal effects can be obtained by bis-(2-pyridylthio-1-oxido)-zinc.

9 Claims, 1 Drawing Sheet

FOOD CONVEYING RESIN BELT

BACKGROUND OF THE INVENTION

1. Field of the Invention

This invention relates to a food conveying resin belt which can convey bare food.

2. Description of the Related Art

In food conveying resin belts to be used as conveyer belts for conveying food in food manufacturing plants and the like, microorganisms are apt to grow on the belt surface due to adhered residues of food as the material to be conveyed, so that there is a possible danger of spoiling quality and shelf life of food caused by the microorganisms. Accordingly, belts are washed after completion of operations in food manufacturing plants, but, in order to effect complete sterilization of microorganisms, it is necessary to carry out the washing for a prolonged period of time using a drug ..such as sodium hypochlorite, hydrogen peroxide and the like in a high concentration, so that it requires much work to carry out sanitation management.

In consequence, food conveying resin belts containing antibacterial and antifungal agents in their resin layers have been provided in recent years. However, in order to convey food naked, it is necessary to pass the food sanitation law (in Japan: the extraction test of FDA #177-2600, Notification No. 20 by the Ministry of Health and Welfare), so that it is important to use drugs which have low toxicity and high safety as the antibacterial and antifungal agents to be included in the resin layers.

In this connection, antibacterial and antifungal agents can be classified into drugs of inorganic system and organic system. As the former drugs of inorganic system, silver base antibacterial and antifungal agents are widely used, but these drugs have a disadvantage of causing discoloration of resins when kneaded with the resins. Accordingly, their amounts to be added are limited and sufficient antibacterial and antifungal properties therefore cannot be obtained. In addition, with regard to the antifungal effect, these silver based antibacterial and antifungal agents have a problem in that they are not always effective against a broad range of fungi.

On the other hand, the latter drugs of organic system have advantages in that they are relatively low in toxicity and high in safety, because they are effective with small amounts to be added, and also cause less discoloration of resins. Therefore, drugs of organic system are drawing attention as antibacterial and antifungal agents, and 2-(4-thiazolyl)benzimidazole and the like imidazole compounds are particularly used in food conveying resin belts as can be seen in Unexamined Japanese Patent Publication (Kokai) No. Hei. 4-333405 and Unexamined Japanese Patent Publication (Kokai) No. Hei. 4-33406.

However, these imidazole compounds can show certain degree of antifungal effect but almost no antibacterial effect. Accordingly, sufficient antibacterial and antifungal properties can not be added simultaneously to a food conveying resin belt which contains the 2-(4-thiazolyl)benzimidazole or the like imidazole compound in its resin layer.

SUMMARY OF THE INVENTION

It is an object of the present invention to provide a food conveying resin belt which has high antibacterial and antifungal effects.

The food conveying resin belt of the present invention is a food conveying resin belt in which its conveying face is formed with a resin layer, wherein an antibacterial and antifungal agent composition containing bis-(2-pyridylthio-1-oxido)-zinc as its active ingredient is included in the resin layer.

Also, in the food conveying resin belt, a mixture comprising bis-(2-pyridylthio-1-oxido)-zinc, an ultraviolet ray absorbing agent, a discoloration preventing agent and a dispersing agent is used as the aforementioned antibacterial and antifungal agent composition.

Further, in the food conveying resin belt, bis-(2-pyridylthio-1-oxido)-zinc, an ultraviolet ray absorbing agent, a discoloration preventing agent and a dispersing agent of the antibacterial and antifungal agent composition are dispersed or dissolved in the aforementioned resin.

Moreover, in the food conveying resin belt, a food conveying resin belt in which a tension member carcass impregnated and adhered with an adhesion treating agent is laminated on the resin layer of the conveying face, which is characterized in that an antibacterial and antifungal agent composition containing bis-(2-pyridylthio-1-oxido)-zinc as its active ingredient is included in the adhesion treating agent.

According to the present invention, high antibacterial and antifungal effects can be obtained by bis-(2-pyridylthio-1-oxido)-zinc.

Also, shortened life of the belt due to its deterioration by ultraviolet rays can be prevented by the ultraviolet ray absorbing agent, decoloration of the belt can be prevented by the discoloration preventing agent and, what is more, each component of the antibacterial and antifungal agent composition can be dispersed or dissolved uniformly in the resin layer by the effect of the dispersing agent.

Further, the antibacterial and antifungal effects can be increased to more higher levels effected by their uniform dispersion or dissolution in the resin layer.

Moreover, the antibacterial and antifungal effects can be obtained even in the layer of a tension member carcass which becomes the back side of the conveying face, so that high antibacterial and antifungal effects can be obtained in the whole sides of the belt.

DETAILED DESCRIPTION OF THE INVENTION

Detailed description of the present invention will be described referring to the accompanying drawings as follows.

Desirable conditions as the antibacterial and antifungal agent composition to be included in the food conveying resin belt, from the viewpoint of its properties, are as follows. Namely, it is in the form of fine powder with white or light yellow in appearance so as not to have coloration of the resin layer and tension member layer. It is in the form of fine particles having such a size that they can be passed through a screen of 100 mesh and therefore are able to be dispersed or dissolved uniformly in the resin layer. It is stable even at a resin forming temperature and it is insoluble in water so that it is not eluted with water.

With regard to the antifungal performance of the antibacterial and antifungal agent composition, it is desirable that the composition has the antifungal effects of JIS Z 2911 and ASTM•G21-70.

Thus, in the present invention, an antibacterial and antifungal agent composition which contains bis-(2-pyridylthio-1-oxido)-zinc as its active ingredient is used as the composition which can satisfy these conditions. This drug bis-(2-pyridylthio-1-oxido)-zinc not only can satisfy the aforementioned conditions but also has low toxicity that can pass the extraction test of FDA standard #177-2600, the Ministry of Health and Welfare Notification No. 20.

With regard to the antibacterial properties of the antibacterial and antifungal agent composition, it exerts the performance shown in the following Table 1.

TABLE 1

| Microorganisms | MIC(*) |
|---|---|
| Escherichia coli | 15.0 |
| Staphylococcus aureus | 7.5 |
| Bacillus subtilis | 7.5 |
| Pseudomonas aeruginosa | 15.0 |
| Salmonella typhimurium | 15.0 |
| Aspergillus niger | 3.0 |
| Penicillium citrinum | 3.0 |
| Chaetomium globosum | 3.0 |
| Cladosporium cladosporioides | 3.0 |
| Rhizopus stolonifer | 15.0 |

(*)MIC: minimum inhibitory concentration (ppm)

Figure 1:
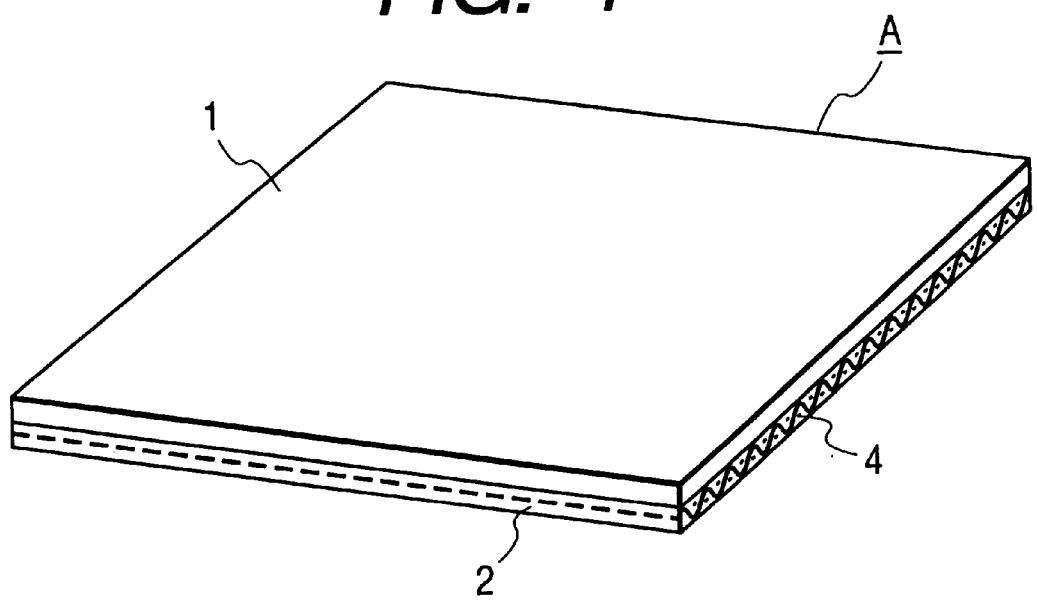
FIG. 1 is a perspective view showing a part of a food conveying belt having a one-ply structure.

As shown in FIG. 1, a food conveying belt A is prepared by laminating a resin layer 1 on the surface of a tension member layer 2 which is formed by impregnating a tension member carcass 4 with an adhesion treating agent, and the surface resin layer 1 becomes the food conveying face. According to the present invention, the food conveying belt A is prepared by allowing this surface resin layer 1 to include the aforementioned antibacterial and antifungal agent composition containing bis-(2-pyridylthio-1-oxido)-zinc as its active ingredient. Also, it is desirable to include this antibacterial and antifungal agent composition containing bis-(2-pyridylthio-1-oxido)-zinc as its active ingredient in the tension member layer 2, too.

Figure 2:
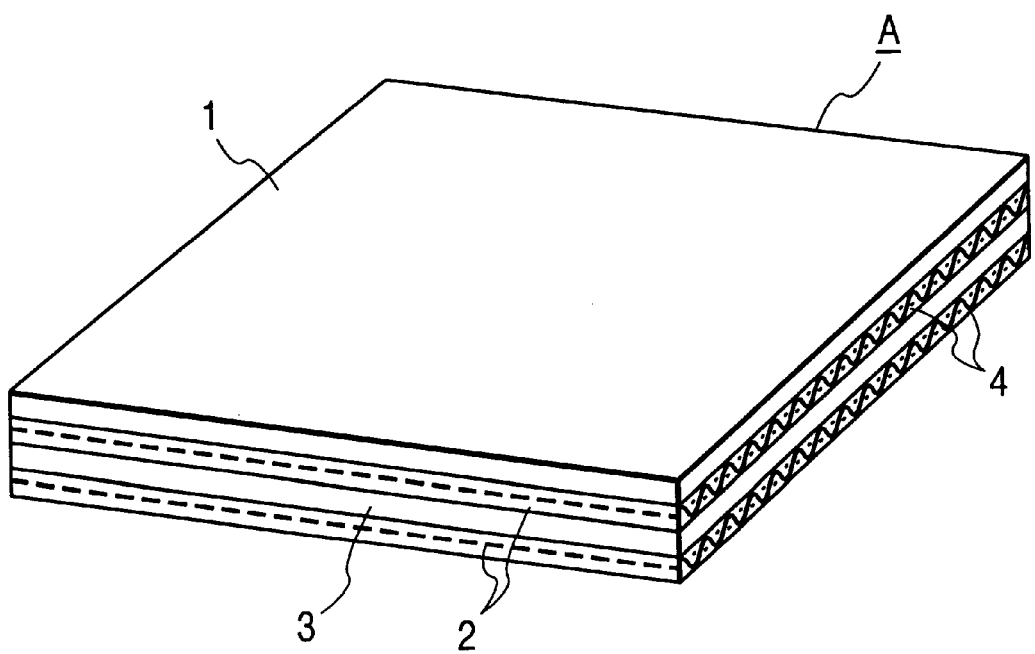
FIG. 2 is a perspective view showing a part of a food conveying belt having a two-ply structure.

The food conveying belt A shown in FIG. 1 is a one-ply belt having the surface resin layer 1 and the back side tension member layer 2, it may be formed as a two-ply belt comprised of two resin layers 1 and 3 and two layers of the tension member layer 2. However, in the manner as shown in FIG. 2, an intermediate resin layer 3 is interposed between two layers of the tension member layer 2 formed by coating an adhesion treating agent on the tension member carcass 4, and the resin layer 1 to be used as the conveying face is laminated on the surface of one of the tension member layer 2. Even in this two-ply food conveying belt A, the aforementioned antibacterial and antifungal agent composition containing bis-(2-pyridylthio-1-oxido)-zinc as its active ingredient is included in the surface resin layer 1, and it is desirable to include this antibacterial and antifungal agent composition containing bis-(2-pyridylthio-1-oxido)-zinc as its active ingredient in the intermediate resin layer 3 and the adhesion treating agent in each tension member layer 2. In this connection, a thin adhesive layer formed by the adhesion treating agent impregnated in the tension member carcass 4 of the tension member layer 2 is located between the tension member layer 2 and the resin layer 1 and between the tension member layer 2 and the intermediate resin layer 3, and the tension member layer 2 is laminated with the resin layer 1 and the intermediate resin layer 3 by close adhesion effected by the adhesive layer. In the present invention, the thickness of the resin layer is preferably in the range of 0.1 mm to 10 mm, that of the intermediate resin layer is preferably in the range of 0.1 mm to 0.5 mm, and that of the tension member layer are preferably in the range of 0.3 mm to 2.0 mm.

According to the food conveying belt A of the present invention, a polyurethane resin, a vinyl chloride resin, a polyolefinic resin or the like can be used as the resin which forms the aforementioned resin layer 1 and intermediate resin layer 3. Examples of the polyurethane resin to be used include conventional thermoplastic polyurethane resins, namely polyol resins in which urethane groups are formed by allowing a polyol having two or more active hydrogens in one molecule to react with an isocyanate compound having two or more isocyanate groups in one molecule. As the polyol, polyether polyols such as polypropylene glycol, polyethylene glycol and a copolymer of propylene oxide with ethylene oxide can be used, and it is possible, as a matter of course, to use a polyester polyol, a polybutadiene polyol, an acrylic polyol, a phenolic polyol and the like. As the polyolefinic resin, polyethylene, polypropylene and the like can be used.

With regard to the aforementioned adhesion treating agent to be adhered to the tension member carcass 4 by means of its impregnation, a liquid form prepared by using a polyurethane resin as the main component, mixing it with a solvent which can dissolve the polyurethane resin and then stirring the mixture can be used, and similar polyol polyurethane described in the foregoing can be used as the polyurethane resin. The solvent can be optionally selected for example from dimethylformamide, toluene, triethylene glycol, m-cresol, carbitol, terpinol and the like, depending on the kind of polyurethane resin to be used. Concentration of the adhesion treating agent can be adjusted at will taking workability and adhesive property into consideration.

An example of the adhesion treating agent consisting of a dip solution and a size solution. Treatment of the tension member carcass 4 can be effected by a method in which the untreated tension member carcass 4 is firstly dipped in the dip solution and then dried, and the resulting tension member carcass 4 is impregnated with the size solution using a docter knife to effect its adhesion and then dried. In this manner, the adhesion treating agent can be adhered to inner part of the tension member carcass 4 by its impregnation. In this case, the dip solution and size solution have the same resin component, but their solvents are controlled in such amounts that solid content of the dip solution becomes smaller than that of the size solution.

Thus, the food conveying belt A of the present invention having antibacterial and antifungal activities can be obtained by including the antibacterial and antifungal agent composition which contains bis-(2-pyridylthio-1-oxido)-zinc as its active ingredient in the resin that forms the resin layer 1 and intermediate resin layer 3 or in the adhesion treating agent to be adhered by impregnation to the tension member carcass 4.

According to the present invention, the antibacterial and antifungal agent composition is used by blending the bis-(2-pyridylthio-1-oxido)-zinc as the active antibacterial and antifungal ingredient with an ultraviolet ray absorbing agent and a discoloration preventing agent and further with a dispersing agent.

The ultraviolet ray absorbing agent is formulated in order to prevent deterioration of the belt caused by the action of ultraviolet rays, and useful examples of the ultraviolet ray absorbing agent include benzotriazole base ultraviolet ray absorbing agents such as 2-(3-t-butyl-5-methyl-2-hydroxyphenyl)-5-chlorbenzotriazole, 2-(3,5-di-t-butyl-2-hydroxyphenyl)-5-chlorobenzotriazole, 2-(5-methyl-2-hydroxyphenyl)benzoriazole, 2-(3,5-di-t-amyl-2-hydroxyphenyl)benzotriazole, 2-(3,5-di-t-butyl-2-hydroxyphenyl)benzotriazole, 2-{2-hydroxy-3,5-bis($\alpha,\alpha$-dimethylbenzyl)phenyl}-2H-benzotriazole, 2-(2-hydroxy-5'-t-octylphenyl)benzotriazole and the like, and hindered amine base ultraviolet ray absorbing agents such as a dimethyl succinate/1-(2-hydroxyethyl)-4-hydroxy-2,2,6,6-tetramethylpiperidine condensation polymer, 2,5-bis{5'-t-butylbenzoxazolyl(2)}thiophene and the like.

The discoloration preventing agent is formulated in order to prevent discoloration of the active ingredient of the antibacterial and antifungal agent, and disodium ethylenediaminetetraacetate, acidic sodium hexametaphosphate and the like chelating agents can be used as the discoloration preventing agent.

When the aforementioned bis-(2-pyridylthio-1-oxido)-zinc, ultraviolet ray absorbing agent and discoloration preventing agent which constitute the antibacterial and antifungal agent composition are kneaded or mixed with the resin or adhesion treating agent, according to the present invention, the antibacterial and antifungal agent composition is prepared by blending bis-(2-pyridylthio-1-oxido)-zinc with the ultraviolet ray absorbing agent and the discoloration preventing agent and further with a dispersing agent, in order to effect uniform dispersion or dissolution of each of these components in the resin and adhesion treating agent by improving their fluidity and dispersion ability. As the dispersing agent, calcium carbonate, talc, silicon dioxide and the like can be used.

The antibacterial and antifungal agent composition thus prepared in the aforementioned manner is in the form of powder having an approximate particle size of from 50 $\mu$m to 150 $\mu$m, preferably from 75 $\mu$m to 125 $\mu$m and therefore capable of passing through a screen of 100 mesh. Although not particularly limited, the antibacterial and antifungal agent composition may have a compositional ratio preferably within the range of 20 to 50 parts by weight of the ultraviolet ray absorbing agent, 20 to 50 parts by weight of the discoloration preventing agent and 100 to 400 parts by weight of the dispersing agent based on 100 parts by weight of bis-(2-pyridylthio-1-oxido)-zinc.

Also, the amount of the antibacterial and antifungal agent composition to be added to the resin which forms the resin layer 1 and the internal resin layer 3 and the resin in the adhesion treating agent with which the tension member carcass 4 is impregnated may be set preferably within the range of from 0.1 to 1.0% by weight so that the amount of bis-(2-pyridylthio-1-oxido)-zinc as the active ingredient of the antibacterial and antifungal agent composition becomes 0.01 to 0.5% by weight. When the amount of the antibacterial and antifungal agent composition to be blended is smaller than 0.1% by weight, it is difficult to add sufficient antibacterial and antifungal effects, ultraviolet ray preventing effect and decoloration preventing effect to the food conveying belt A. On the contrary, the blending amount exceeding 1.0% by weight is economically disadvantageous, because not only it is possible to cause decoloration of the resin by reacting with additive agents in the resin at the time for example of the extrusion forming of the resin layer 1, but also generation of blooming on the resin surface becomes frequent and proportionally increased antibacterial and antifungal effects cannot be expected.

In addition, since a dispersing agent is formulated in the antibacterial and antifungal agent composition, each component of the antibacterial and antifungal agent composition is uniformly dispersed or dissolved in the resin and the adhesion treating agent when the antibacterial and antifungal agent composition is added to the resin and the adhesion treating agent and kneaded or mixed, so that the antibacterial and antifungal effects, ultraviolet ray preventing effect and decoloration preventing effect are exerted efficiently.

EXAMPLES

Next, the present invention is illustratively described with reference to the following examples.

Example 1

An antibacterial and antifungal agent composition in the form of fine powder capable of passing through a 100 mesh screen was prepared by mixing each of the components of the following composition.

| | |
|---|---|
| bis-(2-pyridylthio-1-oxido)-zinc | 100 parts by weight |
| 2-(3-t-butyl-5-methyl-2-hydroxyphenyl)-5-chlorobenzotriazole | 30 parts by weight |
| disodium ethylenediaminetetraacetate | 20 parts by weight |
| calcium carbonate | 300 parts by weight |

Next, a polyetger system polyurethane resin (a polytetramethylene ether glycol. system) was made into pellets, dry-blended with 0.2% by weight of the just prepared antibacterial and antifungal agent composition, plasticized by heating and then extruded in a sheet form using an extruder, and the thus obtained sheet was made into cylindrical pellets of 2 to 4 mm in diameter and 1 to 4 mm in length. Each component of the antibacterial and antifungal agent composition was uniformly dispersed in the pellets. These pellets were then applied to another extruder and extruded in the form of a sheet having a thickness of 0.3 mm.

Separately from this, an adhesion treating agent was prepared, which consisted of a dip solution prepared by adding 850 parts by weight of a mixture solvent of dimethylformamide and toluene and 0.5 part by weight of the aforementioned antibacterial and antifungal agent composition to 100 parts by weight of a polyether system polyurethane resin (a polytetramethylene ether glycol system) and a size solution prepared by adding 400 parts by weight of a mixture solvent of dimethylformamide and toluene and 0.5 part by weight of the aforementioned antibacterial and antifungal agent composition to 100 parts by weight of the polyether system polyurethane resin (a polytetramethylene ether glycol system), and a polyester carcass was treated with the thus prepared adhesion treating agent by firstly dipping the polyester carcass in the dip solution to effect its impregnation with 10% by weight (solid base) of the dip solution and drying it at a temperature of 150 to 160° C. for 30 to 60 seconds, and then coating the size solution on the surface of the thus dipping treated polyester carcass using a docter knife to effect its adhesion impregnation with 20% by weight (solid base) of the size solution and drying it at a temperature of 150 to 160° C. for 30 to 60 seconds.

Thereafter, the polyurethane resin extrusion sheet obtained in the above manner was put on the polyester carcass which has been impregnated with the adhesion treating agent and subjected to pressure lamination by a rotocure method while heating at a temperature of 150 to 160° C., thereby producing a food conveying belt A of a one-ply structure comprising a surface resin layer 1 and a back side tension member layer 2 of a carcass 4 as shown in FIG. 1.

Example 2

An antibacterial and antifungal agent composition in the form of fine powder capable of passing through a 100 mesh screen was prepared by mixing each of the components of the following composition.

| | |
|---|---|
| bis-(2-pyridylthio-1-oxido)-zinc | 100 parts by weight |
| 2-(3-t-butyl-5-methyl-2-hydroxyphenyl)-5-chlorobenzotriazole | 20 parts by weight |
| disodium ethylenediaminetetraacetate | 20 parts by weight |
| calcium carbonate | 350 parts by weight |

Using this antibacterial and antifungal agent composition, a food conveying belt A of a one-ply structure was prepared in the same manner as described in Inventive Example 1.

Comparative Example 1

The same polyurethane resin used in Inventive Example 1 was kneaded with 0.2% by weight of an imidazole antibacterial and antifungal agent, 2-(4-thiazolyl) benzimidazole, also, the same adhesion treating agent used in Inventive Example 1 was mixed with 0.5% by weight of 2-(4-thiazolyl)benzimidazole (per polyurethane resin), and a polyester carcass was impregnated with the resulting adhesion treating agent in the same manner as described in Inventive Example 1. Thereafter, using the polyurethane resin and the carcass impregnated with the adhesion treating agent, a food conveying belt was produced in the same manner as described in Inventive Example 1.

Comparative Example 2

The same polyurethane resin used in Inventive Example 1 was kneaded with 0.2% by weight of an inorganic silver base antibacterial and antifungal agent, silver-added zirconium phosphate, also, the same adhesion treating agent used in Inventive Example 1 was mixed with 0.5% by weight of silver-added zirconium phosphate (per polyurethane resin), and a polyester carcass was impregnated with the resulting adhesion treating agent in the same manner as described in Inventive Example 1. Thereafter, using the polyurethane resin and the carcass impregnated with the adhesion treating agent, a food conveying belt was produced in the same manner as described in Inventive Example 1.

Comparative Example 3

Using the polyurethane resin and adhesion treating agent as such without adding the antibacterial and antifungal agent composition, a food conveying belt was produced in the same manner as described in Inventive Example 1.

Each of the food conveying belts obtained in Inventive Examples 1 and 2 and Comparative Examples 1 to 3 was cut off to prepare test pieces of 40 mm x 40 mm in size, and an antibacterial test and a fungi resistance test was carried out.

The antibacterial test was carried out by inoculating and culturing a strain of *Escherichia coli* or *Staphylococcus aureus* in a tryptosoya bouillon medium, adhering a predetermined amount of the thus obtained cell suspension to entire area of both sides of the test piece, carrying out 24 hours of culturing on the resulting test piece under a condition of 30° C. and then extracting the remaining cells with physiological saline to measure the number of cells in 1 ml of the extract. The results are shown in Table 2.

TABLE 2

(Unit of cell counts; cells/ml)

| | E. coli Initial cell count $4.9 \times 10^5$ | St. aureus Initial cell count $1.4 \times 10^5$ |
|---|---|---|
| Ex. 1 | $10^2$ or less | $10^2$ or less |
| Ex. 2 | $10^2$ or less | $10^2$ or less |
| Comp. Ex. 1 | $10^6$ or more | $10^6$ or more |
| Comp. Ex. 2 | $10^6$ or more | $10^6$ or more |
| Comp. Ex. 3 | $10^6$ or more | $10^6$ or more |

(Cell counts on both sides of test piece are almost the same)

The fungi resistance test was carried out using strains of *Aspergillus niger*, *Penicillium funiculosum*, *Gliocladium virrens*, *Chaetomium globosum* and *Aureobasidim pullulans*, in accordance with ASTM•G21-70, by putting a test piece on an agar plate medium (nutrient salt agar medium), spraying about 0.5 ml of a suspension of mixed spores of the above strains uniformly on both sides of the test piece and culturing the strains in a constant temperature and moisture incubator under conditions of 30° C. and 98% RH. The test piece was observed on the 7th and 28th days of the culturing, and the results were evaluated as "0" when no growth of the fungi was found, "1" when growth of the fungi was found on less than 10% of the area of the test piece, "2" when growth of the fungi was found on 10 to 30% of the area of the test piece, "3" when growth of the fungi was found on 30 to 60% of the area of the test piece and "4" when growth of the fungi was found on 60% or more of the area of the test piece. The results are shown in Table 3.

TABLE 3

| | | 7th Day | 28th Day |
|---|---|---|---|
| Example 1 | The face | 0 | 0 |
| | The back | 0 | 0 |
| Example 2 | The face | 0 | 0 |
| | The back | 0 | 0 |
| Comparative Example 1 | The face | 0 | 1 |
| | The back | 0 | 1 |
| Comparative Example 2 | The face | 0 | 1 |
| | The back | 0 | 1 |
| Comparative Example 3 | The face | 0 | 1 |
| | The back | 0 | 4 |

As can be seen in Table 2, the number of grown cells was higher than the initial number of cells in Comparative Example 1 in which an imidazole compound was used as the antibacterial and antifungal agent and Comparative Example 2 in which an inorganic silver compound was used, similar to the case of Comparative Example 3 in which the antibacterial and antifungal agent was not used, while the number of grown cells was reduced to half the number or less of the initial cells in Inventive Examples 1 and 2 in which the antibacterial and antifungal agent composition containing bis-(2-pyridylthio-1-oxido)-zinc as its active ingredient was used, thus showing its antibacterial effect.

Also, as can be seen in Table 3, growth of fungi was observed in Comparative Example 1 in which an imidazole compound was used as the antibacterial and antifungal agent and Comparative Example 2 in which an inorganic silver compound was used, though smaller than the case of Comparative Example 3 in which the antibacterial and antifungal agent was not used, while the fungi did not grown on the test piece in Inventive Examples 1 and 2 in which the antibacterial and antifungal agent composition containing bis-(2- pyridylthio-1-oxido)-zinc as its active ingredient was used, thus showing its high antifungal effect.

Since the present invention is a food conveying resin belt in which its conveying face is formed with a resin layer, wherein an antibacterial and antifungal agent composition containing bis-(2-pyridylthio-1-oxido)-zinc as its active ingredient is included in the resin layer, high antibacterial and antifungal effects can be obtained by bis-(2-pyridylthio-1-oxido)-zinc.

Also, since the present uses a mixture comprising at least bis-(2-pyridylthio-1-oxido)-zinc, an ultraviolet ray absorbing agent, a discoloration preventing agent and a dispersing agent as its antibacterial and antifungal agent composition, shortened life of the belt due to its deterioration by ultraviolet rays can be prevented by the ultraviolet ray absorbing agent, decoloration of the belt can be prevented by the discoloration preventing agent and, what is more, each component of the antibacterial and antifungal agent composition can be dispersed or dissolved uniformly in the resin layer by the effect of the dispersing agent.

Also, since bis-(2-pyridylthio-1-oxido)-zinc, an ultraviolet ray absorbing agent, a discoloration preventing agent and a dispersing agent of the antibacterial and antifungal agent composition are dispersed or dissolved in the resin layer, the antibacterial and antifungal effects can be increased to more higher levels effected by their uniform dispersion or dissolution in the resin layer.

Also, since the invention is a food conveying resin belt in which a tension member carcass impregnated and adhered with an adhesion treating agent is laminated on the resin layer of the conveying face, which is characterized in that an antibacterial and antifungal agent composition containing bis-(2-pyridylthio-1-oxido)-zinc as its active ingredient is included in the adhesion treating agent, the antibacterial and antifungal effects can be obtained even in the layer of a tension member carcass which becomes the back side of the conveying face, so that high antibacterial and antifungal effects can be obtained in the whole sides of the belt.

What is claimed is:

1. A food conveying resin belt comprising a conveying face formed with a resin layer including an antibacterial and antifungal agent composition containing bis-(2-pyridylthio-1-oxido)-zinc as its active ingredient is included in the resin layer.

2. The food conveying resin belt according to claim 1, wherein said antibacterial and antifungal agent composition comprises bis-(2-pyridylthio-1-oxido)-zinc, an ultraviolet ray absorbing agent, a discoloration preventing agent and a dispersing agent.

3. The food conveying resin belt according to claim 2, wherein the bis-(2-pyridylthio-1-oxido)-zinc, the ultraviolet ray absorbing agent, the discoloration preventing agent and the dispersing agent of the antibacterial and antifungal agent composition are dispersed or dissolved in said resin layer.

4. The food conveying resin belt according to claim 1, further comprising a tension member carcass on which said resin layer of said conveying face is laminated.

5. The food conveying resin belt according to claim 4, wherein said tension member carcass is impregnated and adhered with an adhesion treating agent.

6. The food conveying resin belt according to claim 5, wherein the antibacterial and antifungal agent composition containing bis-(2-pyridylthio-1-oxido)-zinc as its active ingredient is included in the adhesion treating agent.

7. The food conveying resin belt according to claim 1, wherein said antibacterial and antifungal agent composition is in the form of powder having an approximate particle size in the range of 50 $\mu$m to 150 $\mu$m.

8. The food conveying resin belt according to claim 1, wherein said antibacterial and antifungal agent composition have a compositional ratio within the range of 20 to 50 parts by weight of the ultraviolet ray absorbing agent, 20 to 50 parts by weight of the discoloration preventing agent and 100 to 400 parts by weight of the dispersing agent based on 100 parts by weight of bis-(2-pyridylthio-1-oxido)-zinc.

9. The food coveying resin belt according to claim 4, further comprising a second tension member carcass and an internal resin layer provided between said tension member carcass and said second tension member carcass.

* * * * *